(12) United States Patent
Pinot

(10) Patent No.: US 6,826,998 B2
(45) Date of Patent: Dec. 7, 2004

(54) ELECTRO HYDRAULIC SERVO VALVE

(75) Inventor: Bernard Pinot, Vitry sur Seine (FR)

(73) Assignee: Lillbacka Jetair Oy, Kauhava (FI)

(*) Notice: Subject to any disclaimer, the term of this patent is extended or adjusted under 35 U.S.C. 154(b) by 6 days.

(21) Appl. No.: 10/186,897

(22) Filed: Jul. 2, 2002

(65) Prior Publication Data

US 2004/0003710 A1 Jan. 8, 2004

(51) Int. Cl.$^7$ .................................................. F15B 9/09
(52) U.S. Cl. .................. 91/363 R; 91/180; 137/625.65
(58) Field of Search ............................... 91/363 R, 503, 91/180; 137/625.65, 625.15, 625.17, 625.21

(56) References Cited

U.S. PATENT DOCUMENTS

| | | |
|---|---|---|
| 2,319,347 A | 5/1943 | Reed |
| 3,690,345 A | 9/1972 | Ericson |
| 3,732,884 A | 5/1973 | Strom |
| 3,835,888 A | 9/1974 | Leutner et al. |
| 4,063,568 A | 12/1977 | Sosulnikov et al. |
| 4,390,158 A | 6/1983 | Lang |
| 4,529,006 A | 7/1985 | Block et al. |
| 4,674,536 A | 6/1987 | Warrick |
| 4,674,539 A | 6/1987 | Sloate |
| 4,794,845 A | 1/1989 | Vick |
| 4,970,885 A | 11/1990 | Chipp et al. |
| 5,014,748 A | 5/1991 | Nogami et al. |
| 5,027,631 A | 7/1991 | Naito |
| 5,040,569 A | 8/1991 | Nogami et al. |
| 5,079,989 A | 1/1992 | Chipp et al. |
| 5,176,017 A | 1/1993 | Tokai |
| 5,339,777 A | 8/1994 | Cannon |
| 5,467,800 A | 11/1995 | Sallas |
| 5,701,791 A | 12/1997 | Schulze et al. |
| 5,839,463 A | 11/1998 | Blackmon et al. |
| 5,954,093 A | 9/1999 | Leonard |

FOREIGN PATENT DOCUMENTS

| | | |
|---|---|---|
| EP | 0646853 A2 | 4/1995 |
| GB | 2051311 | 1/1981 |
| JP | 2000-297866 | 10/2000 |

Primary Examiner—Edward K. Look
Assistant Examiner—Michael Leslie
(74) Attorney, Agent, or Firm—Louis Woo

(57) ABSTRACT

An electro hydraulic servo valve assembly has a valve housing and a spool rotatably fitted to the inside of the housing. A number of ports are off-settedly provided along the length of the valve housing A plurality of orifices are provided along the length of the spool. The positioning of the orifices and the ports are such that only one set of orifices may be aligned with a corresponding set of ports at any one time. The spool has one end coupled to a servo motor so that the servo motor may drivingly rotate the spool relative to the valve body. The other end of the spool is open so that a fluid passage is established between the interior of the spool and any one of the orifices.

16 Claims, 5 Drawing Sheets

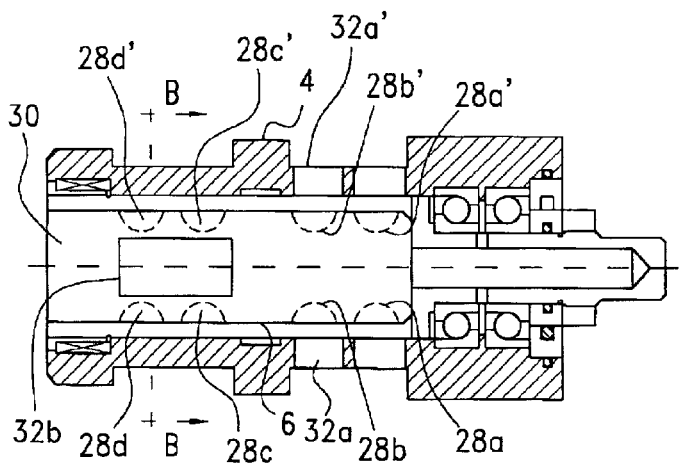 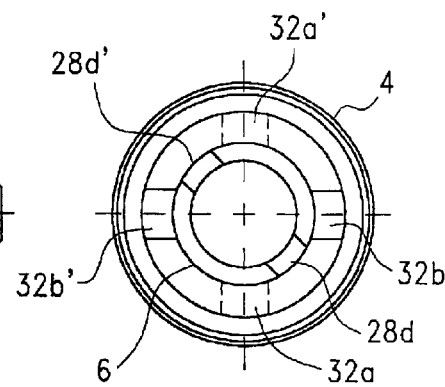
FIG.8A  FIG.8B
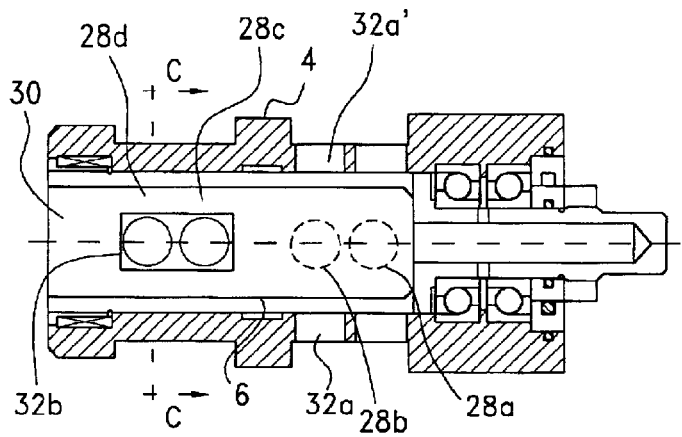 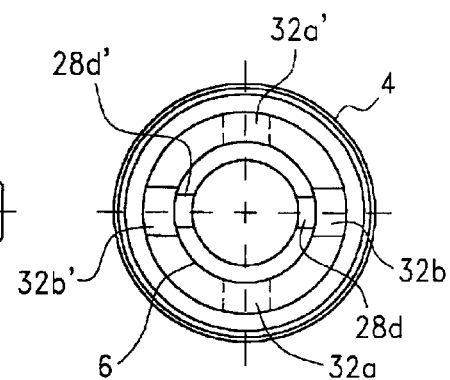
FIG.9A  FIG.9B
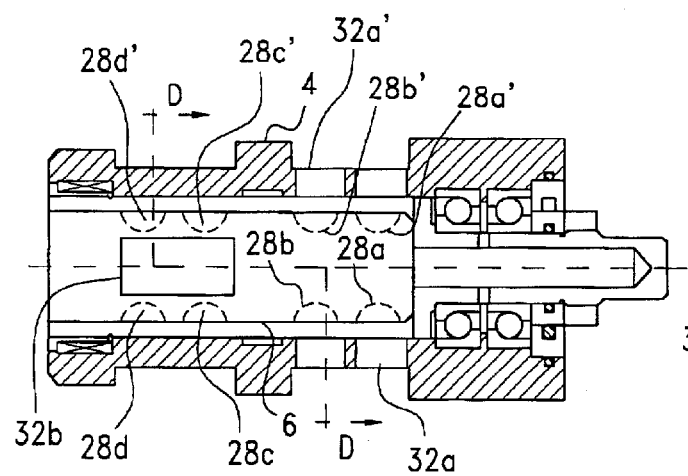 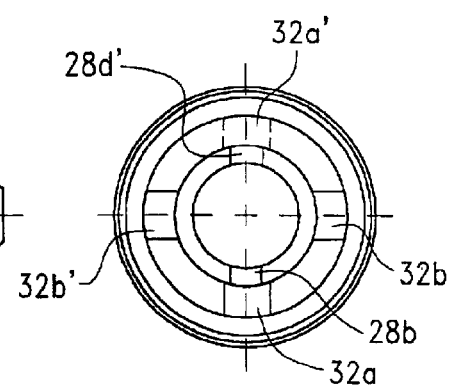
FIG.10A  FIG.10B

ELECTRO HYDRAULIC SERVO VALVE

FIELD OF THE INVENTION

The present invention relates to servo valves and more particularly to an electro hydraulic rotary servo valve that is adaptable to be used with high speed drives of sheet fabricating machines.

BACKGROUND OF THE INVENTION

Servo valves are usually associated with spool type valves that are used to control the flow of fluid, such as hydraulic oil or air, to a hydraulic cylinder or similar drive devices. The flow capacity is usually determined by the size of the spool, and the amount and rate of the flow of fluid are usually determined by the position of the spool relative to the valve body, or housing, to which the spool is movably fitted.

A servo valve acts as an interface to permit low energy electrical signals to manipulate high level hydraulic power. There are generally three types of electrically operated servo valves. They are proportional, directional flow and pressure control. A conventional servo valve is a four port unit that has its spool movable axially along the length of the valve body so that the fluid flow controlled by the valve is in proportion to the spool displacement. And the displacement of the spool is in proportion to the electrical signal applied, thereby enabling the control of the rate of fluid flow, as well as the direction of the fluid flow.

There are a number of conventional servo valves being sold. One of such servo valves is made by the Parker Hannifin Corporation of Elyria, Ohio under their series designation BD. Another servo valve that is used with the hydraulic system of a sheet fabrication machine is made by the Bosch Company under the designation HRV1. Such Bosch valve has its spool movable axially inside the valve body for controlling the flow and rate of hydraulic fluid. There is also disclosed in U.S. Pat. No. 5,954,093 a servo valve that, instead of having an axially movable spool, utilizes a double edged metering blade that is movably mounted to a sleeve fitted inside the bore of a servo valve body, which is divided into a number of spaced apart annular chambers. The fact that the '093 device requires a valve body that is predefined into a number of chambers, the fitting of a sleeve into the valve body and the fitting of a double edged blade within the sleeve mean that the construction of the '093 device is quite complicated, and expensive. A similar rotary servo valve that also requires a multi-chamber valve body, a sleeve fitted within the bore of the body, and a rotating member fitted within the sleeve is disclosed in U.S. Pat. No. 5,467,800. The member that rotates within the sleeve of the '800 device in turn is separated into two closed internal chambers. A published Japanese patent application (11-107134) discloses a servo valve to be used with a turret punch press that has a spool that is movable both axially and rotationally. To enable both axial and rotational movement, both a linear actuator motor and a rotational servo motor are used. Needless to say, such dual motor servo valve is expensive.

A need therefore exists for an uncomplicated and inexpensive electro-hydraulic servo valve that is adaptable to be used with the high speed drive system of a sheet fabrication machine.

SUMMARY OF THE INVENTION

The electro hydraulic servo valve of the instant invention has a valve body or housing that has at least two sets of ports formed along the length of the body offset from each other. A hollow spool or cylinder is fitted inside the bore of the housing. A number of orifices are formed along the length of the spool. The orifices are positioned along the spool such that when the spool is rotated a certain distance, selected ones of the orifices become aligned with corresponding ports of the valve body. The hollow cylinder, in addition to having the orifices formed along its length, also has an open end through which fluid, hydraulic or otherwise, passes. A fluid passage is established between the open end of the cylinder and the driving mechanism of the sheet fabrication machine or system.

The other end of the spool extends out of the valve body and is connected to a servo motor. The motor rotates the spool in accordance with instructions from a processor, which may be a component of the sheet fabrication machine.

The valve housing is made up of an aft section and a fore section. Corresponding ports are provided at each of those sections. The ports at the aft and fore sections are configured to be offset from each other. Those ports in turn are coupled to appropriate conduits. One of the conduits that is coupled to one section of the valve housing is connected to a fluid reservoir or sink to which the hydraulic fluid is stored. Another of the conduits that is coupled to the other section of the valve body is connected to a pump, which pumps the hydraulic fluid from the reservoir. The open end of the spool which forms the fluid passage in turn is connected to forward and return conduits that are in fluid communication with the hydraulic cylinder of the drive mechanism, which may be a piston connected to a ram. By selectively rotating the spool relative to the valve housing, selective fluid paths may be established for pumping the hydraulic fluid to the hydraulic cylinder to drive the ram downwards, or for returning the fluid pumped into the hydraulic cylinder to the hydraulic oil sink to thereby raise the ram. By thus simply rotating the spool relative to the valve body to drive the ram, the servo valve of the instant invention is capable of effecting the bidirectional movement of a fluid at a much greater speed and higher efficiency than conventional servo valves. The movement speed or work cycle of the ram, which is being driven by the servo valve, accordingly is increased.

It is therefore an objective of the present invention to provide a servo valve that operates at a greater speed than conventional servo valves.

It is yet another objective of the present invention to provide a servo valve that is less expensive to construct and simpler to use than conventional servo valves.

It is yet another objective of the present invention to provide a servo valve whose work cycle can be increased, and therefore whose work efficiency is higher than conventional servo valves.

BRIEF DESCRIPTION OF THE DRAWINGS

The above-mentioned objectives and advantages of the present invention will become apparent and the invention itself will be best understood by reference to the following description of the invention taken in conjunction with the accompanying drawings, wherein:

FIG. 8a is a cross-sectional view showing the interrelationship between the orifices of the spool and the ports of the housing of the valve assembly of the instant invention;

FIG. 8b is a cross-sectional view along line B—B of the valve assembly of FIG. 8a;

FIG. 9a shows a different orientation of the spool relative to the valve body;

FIG. 9b is a cross-sectional view along line C—C of the valve assembly of FIG. 9a;

FIG. 10a is yet another cross-sectional view of the valve assembly of the instant invention that shows yet another orientation of the spool relative to the valve body; and FIG. 10b is a cross-sectional view along line D—D of the FIG. 10a valve assembly.

DETAILED DESCRIPTION OF THE INVENTION

Figure 1:
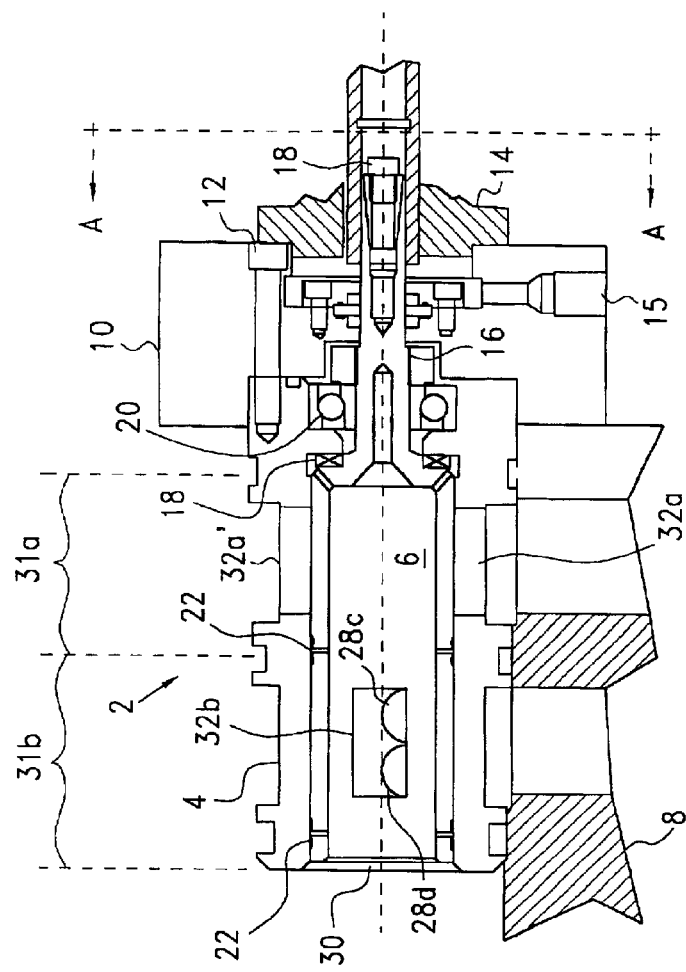
FIG. 1 is a cross-sectional view of the servo valve assembly of the instant invention.

With reference to FIG. 1, a cross-sectional view of the electro hydraulic servo valve assembly of the instant invention is shown. In particular, valve assembly 2 has a valve body, or housing 4. Rotatably fitted within the interior of housing 4 is a hollow cylinder 6, otherwise known as a spool. Valve body 4 is mounted to a frame 8 by conventional means such as bolts or screws. Valve assembly 2 is furthermore mounted to another frame or block 10 at the front of housing 4 by a number of bolts 12. A servomotor 14 is mounted to frame 10. A safety conduit 15 is integrated to block 10. Any leak of fluid from the valve assembly is recovered by means of safety conduit 15.

Spool 6 is shown to have an extension, or neck 16 that is supported by bearings 18 and 20. Extension neck 16 in turn is coupled to motor 14 by means of a bolt 18. Thus, when servomotor 14 rotates, spool 6 similarly rotates in the same direction. A number of bearings 22 support spool 6 so as enable spool 6 to rotate smoothly relative to valve body 4. Motor 14 is mounted to frame 10 by a number of bolts 24.

Figure 3:
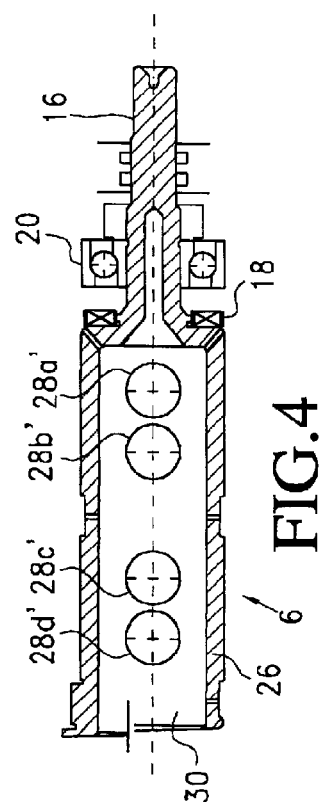
FIG. 3 is a side view of the spool of the valve assembly of FIG. 1.
Figure 4:
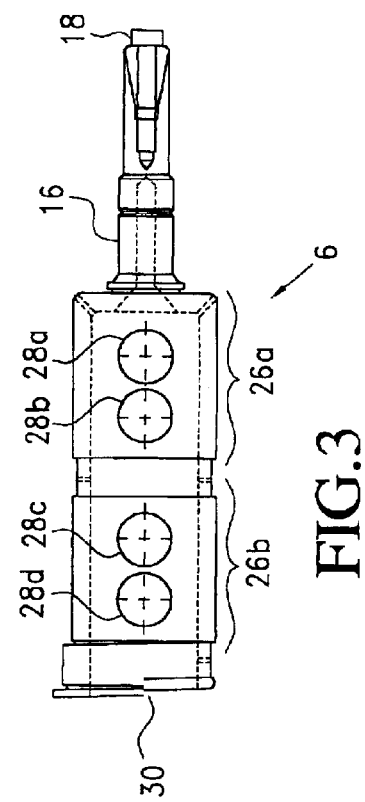
FIG. 4 is a cross-sectional view of the spool of FIG. 3.
Figure 5:
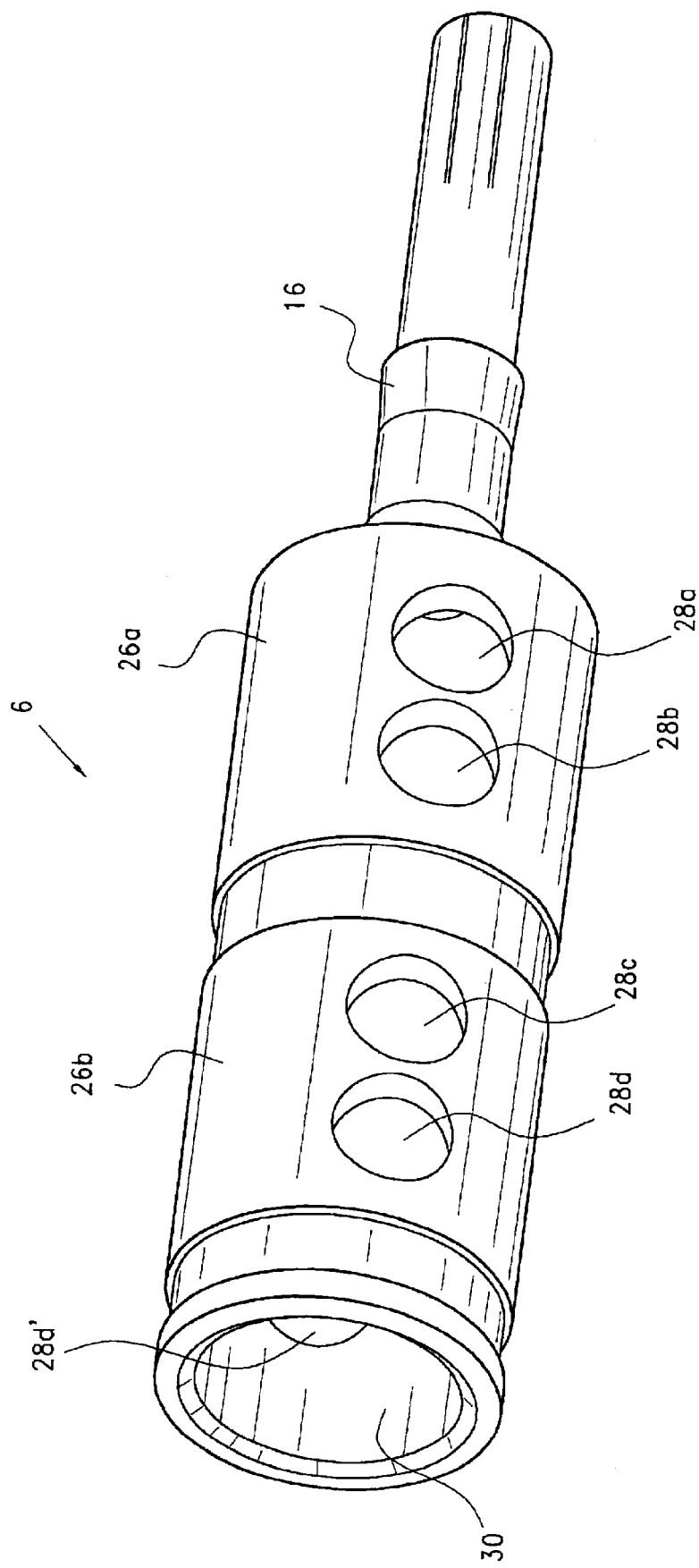
FIG. 5 is a perspective view of the spool of the servo valve of the instant invention.

As best shown in the side view of FIG. 3, the cross-sectional view in FIG. 4 and the perspective view of FIG. 5, spool 6 comprises a hollow cylinder 26 having extending at its one end neck 16. As was noted earlier, the distal end of neck 16 is configured to be fixedly coupled to motor 14 by a screw or bolt 18, so that motor 14 could drivingly rotate spool 6 relative to valve housing 4. The hollow cylinder of spool 6 in turn is separated into a first portion 26a and a second portion 26b. These portions may be referred to as the fore and aft sections, respectively. At each of the sections, there are a number of holes, or orifices 28.

As best shown in the perspective view of FIG. 5, each of the orifices has a matching orifice at the other side of spool 6. In all, for the embodiment being discussed, there are eight orifices, four on each side of the hollow cylinder of spool 6. It should be appreciated that a smaller number, or a larger number, of orifices may also be possible for different embodiments of the instant invention. For ease of discussion, the front facing orifices 28 in FIG. 3 are labels 28a–28d, and the orifices that are on the other side of spool 6, and which are shown in the cross-section view of FIG. 4, are designated 28a'–28d'. As best shown in FIG. 5, spool 6 is open at its end away from extension neck 6. Accordingly, an open pathway is established from open end 30 to any one of the orifices 28 of spool 6.

As shown in FIG. 1, housing body 4 could be considered to have a fore section 31a and an aft section 31b. There are a number of ports 32 formed along valve body 4. The respective ports 32 at aft section 31b are offset from the respective ports 32 at fore section 31a along housing 4. Although not limited to such shape or configuration, for the embodiment shown, ports 32 are rectangular in shape and are of such a dimension that adjacent pairs of orifices may be aligned with each port. Such alignment may be seen for example with respect to port 32b and adjacent orifices 28c and 28d in FIG. 9a. Thus, when spool 6 and valve housing 4 are rotated relative to each other, orifices 28a, 28b and 28a', 28b' may be aligned with ports 32a and 32b', respectively. Similarly, when spool 6 is selectively rotated relative to valve housing 4, orifices 28c, 28d and 28c', 28d' may be aligned with ports 32b and 32b', respectively. Note that the amount of opening for each of the orifices 28 with respect to a port 32 may be controlled, as only a portion of the orifices need to be exposed. See for example the partial alignment of orifices 28c and 28d with respect to port 32b in FIG. 1. Accordingly, the amount of fluid that is passable between the orifices and their corresponding ports of the valve assembly of the instant invention may be selectively controlled.

Figure 2:
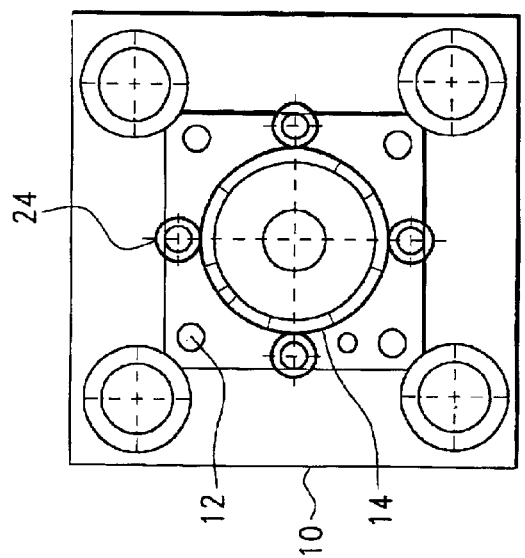
FIG. 2 is a view along line A—A of FIG. 1.
Figure 6:
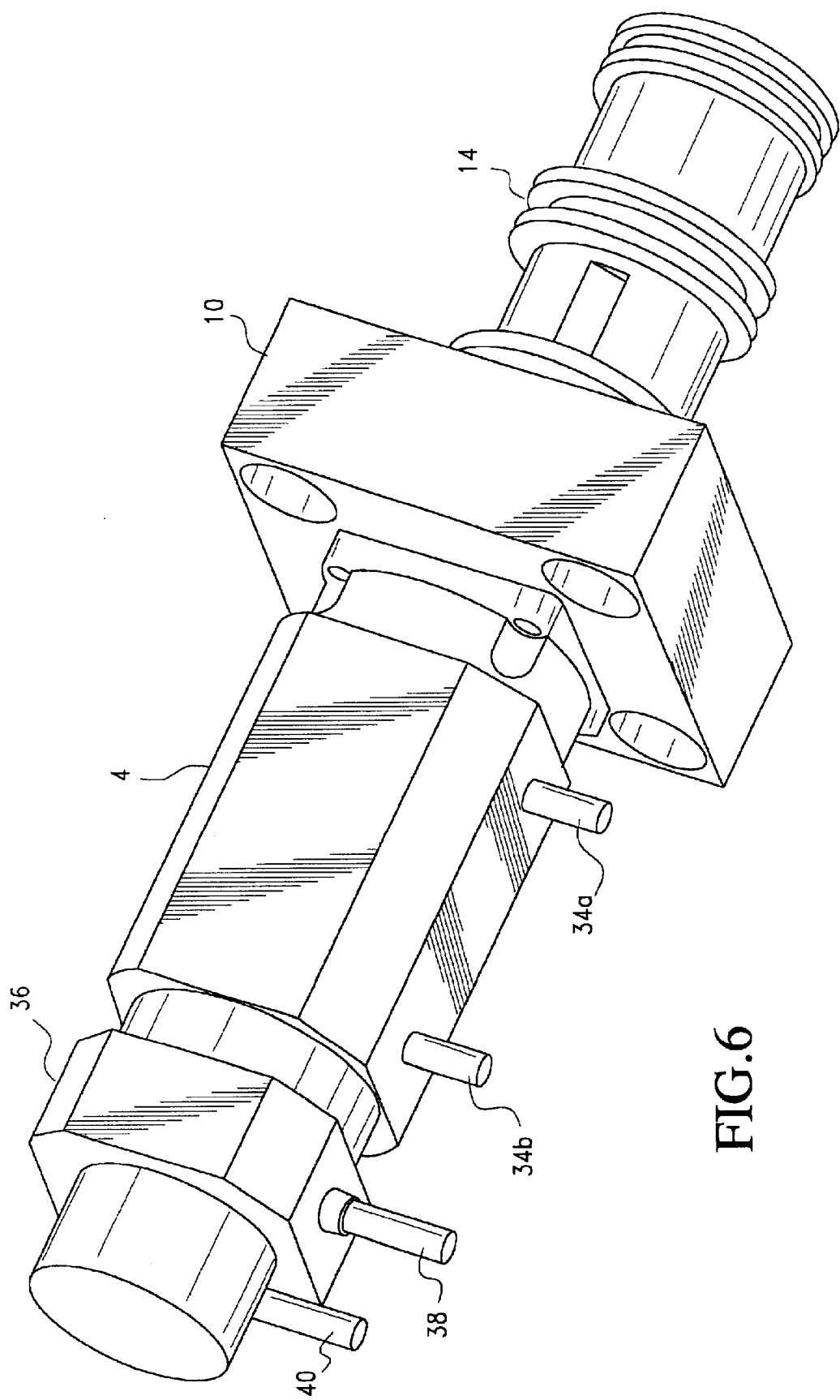
FIG. 6 is a perspective view of the servo valve assembly of the instant invention.

FIG. 6 shows in perspective view an assembled electro hydraulic servo valve of the instant invention. As shown, valve housing 4 is coupled to frame 10, which front surface is shown in FIG. 2. Connected to the other side of frame 10 is a servomotor 14 for driving spool 6 inside valve housing 4. Valve body 4 is further shown to have extending therefrom two conduits 34a and 34b. Each of the conduits 34 is configured to be in fluid communication with a pair of ports 32. Thus, conduit 34a may be in fluid communication with ports 32a, 32a', while conduit 34b may be in fluid communication with ports 32b, 32b'.

Further shown in the servo valve assembly of FIG. 6 is a cap assembly 36 that is mounted to valve housing 4 to be in communication with open end 30 of spool 6. There are two conduits 38 and 40 extending from cap assembly 36. Although not shown, one of conduits 38, 40 is used as an input to open end 30 while the other of conduits 38, 40 is used as an output from open end 30. Taken together, conduits 38 and 40 provide a closed fluid passage to/from spool 6, with respect to the hydraulic cylinder of the drive mechanism, for example. Conventional respective one way valves in cap assembly 36 guarantee that the fluid flow for each of conduits 38, 40 would be only one way, be it output from or input to open end 30 of spool 6.

Figure 7:
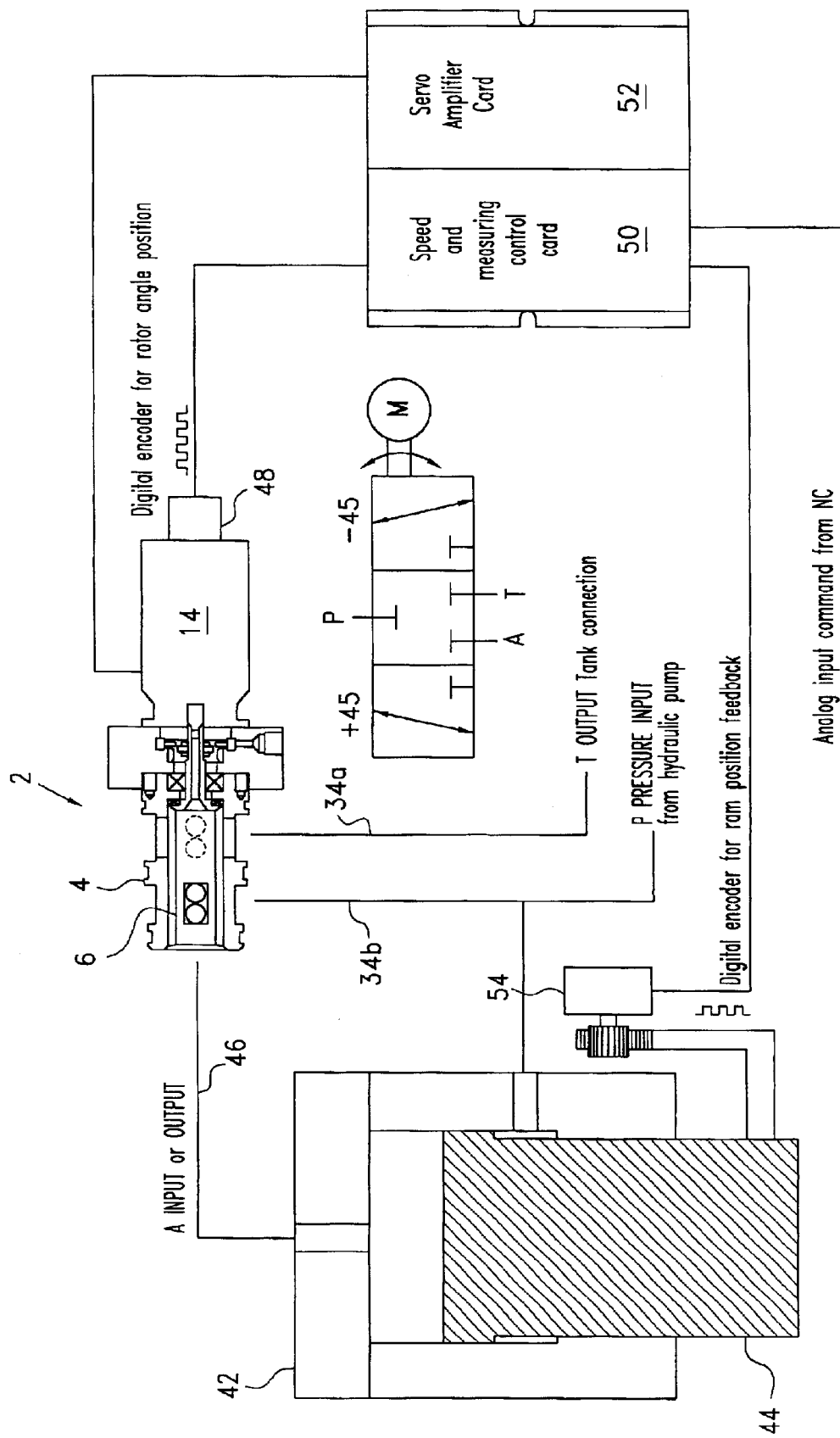
FIG. 7 is a simplified schematic of the valve assembly of the instant invention and its interconnections to the drive system and control system of a sheet fabrication machine or work center.

The interconnections of the electro hydraulic servo valve assembly of the instant invention with a machine such as for example a sheet fabrication machine, and more particularly the drive mechanism and the controller of the machine, is shown in FIG. 7. For the servo valve assembly of FIG. 7, it should be appreciated that such could be used in a great number of machines or work centers including, but not limited to, hydraulic turret punch presses and benders that require high speed drive mechanisms that are driven hydraulically.

As shown in FIG. 7, servo valve assembly 2 is connected to a drive mechanism, in the form of a drive cylinder 42, for example, of a sheet fabrication machine. A piston 44 is movable in drive cylinder 42 so as to drive a ram (not shown) of a punch press or a bender blade of a bending machine, for example. Drive cylinder 42 is connected to servo valve assembly 2 by means of conduits 38, 40 shown in FIG. 6. These conduits are simply referenced as line 46 in the FIG. 7 embodiment. The other conduits extending from servo valve assembly 2, namely conduits 34a and 34b, are connected to a tank or sink that contains hydraulic fluid and a pump for pumping the hydraulic fluid. It should be appreciated that even though hydraulic fluid is discussed herein, other types of fluids such as for example air or water are practicable with the instant invention. In any event, conduit 34a effects a path for routing the hydraulic fluid from servo valve assembly 2 to the hydraulic tank wherein the hydraulic fluid is stored, while conduit 34b establishes a path from a pump for pumping hydraulic fluid from the hydraulic tank to valve assembly 2. By outputting and retrieving the hydraulic fluid to and from drive cylinder 42, piston 44 is driven in up or down strokes.

Servo valve assembly 2 has connected thereto servo motor 14, which rotates spool 6 relative to valve housing 4 for selectively aligning the various orifices 28 of spool 6 with corresponding ports 32 of valve housing 4. As further shown in FIG. 7, coupled to motor 14 is a digital encoder 48 that senses the angle position of the rotor of servo motor 14 and sends the sensed angle position of the rotor to the processor system that controls the operation of the sheet fabrication machine. In this instance, the sensed rotor angle position is sent to a speed and measuring control card 50 of the processor system, as a feedback to the processor system, which in turn controls the movement of the servo motor, by means of a servo amplifier card 52. To provide additional feedback for enhancing the operation of the system, the position of either the driving piston or the ram, with respect to a base reference position, is measured by another digital encoder 54. This measured ram position is fed as a feedback to speed and measuring control card 50. With both feedback signals from servo motor 14 and the ram, the processor system of the machine of the FIG. 7 embodiment could accurately control the amount of force to drive the piston of the drive cylinder 42, as well as the frequency with which piston 44 is to be driven.

The process with which hydraulic fluid is provided to and from the drive mechanism of a machine, for example drive cylinder 42, is further explained with respect to FIGS. 8–10.

As shown in FIGS. 8a and 8b, which is view B–B of FIG. 8a, spool 6 is rotated relative to valve housing 4 in an orientation such that all of the orifices 28 of spool 6 are not in alignment with any of the ports 32 of valve housing 4. In this instance, the servo valve assembly is closed so that no fluid is provided via open end 30 to or from drive cylinder 42. This orientation is best shown in FIG. 8b in which orifices 28d, 28d', as well as the not shown orifices 28c, 28c', 28b, 28b', 28a, 28a' are orientated in the close position with respect to ports 32b, 32b' and 32a, 32a' of valve housing 4.

By selectively rotating spool 6 relative to valve housing 4, in this instance by spool 6 being rotated for example –45° relative to the reference base of FIG. 8b, orifices 28c and 28d (as well as not shown 28c' and 28d') are in full alignment with port 32b (32b'). At the same time, orifices 28a, 28a', and 28b, 28b' are in complete misalignment with ports 38a, 38a', respectively. Accordingly, hydraulic fluid is provided under pressure, via a pump, from the hydraulic reservoir or tank, to open end 30 of spool 6, and from there by means of one of the conduits 38, 40 as output to drive cylinder 42 to drive ram 44 in a downward movement. Even though FIG. 9a shows orifices 28c, 28d to be in full alignment with port 32b so that the hydraulic fluid may be fully provided under pressure to drive cylinder, it should be appreciated that spool 6 may be selectively rotated so that only respective portions of orifices 28c and 28d (and 28c' and 28d') may be rotated to be in alignment with port 32b (32b'), so that a smaller amount of hydraulic fluid may be provided to drive cylinder 42 for driving ram 44 at a slower speed and possibly a shorter distance in its down strokes.

It should further be appreciated that albeit eight orifices are disclosed to be working in cooperation with four ports in the shown embodiment, in practice, all it may need is one orifice in the spool and one port in the body for the present invention to work. Conversely, instead of the eight orifices and four ports disclosed, a greater number of orifices and a correspondingly greater number of ports offset from each other may also be utilized.

FIGS. 10a and 10b illustrate the rerouting of the hydraulic fluid from the drive cylinder back to the hydraulic reservoir. In this instance, as best shown in the D—D view of FIG. 10b, spool 6 has been selectively rotated, in this instance +45° from the base reference orientation of FIG. 8b. As shown, orifices 28c, 28d (28c', 28d') no longer are in alignment with port 32b (32b'). On the other hand, orifices 28a, 28b (28a', 28b') are in alignment with port 32a (32a'). Accordingly, the hydraulic fluid is fed from drive cylinder 42, with the upward stroke of ram 44 via the input conduit of path 46, to the interior of spool 6 by way of open end 30. The fluid path is established by ports 32a, 32a' being in fluid communication with the hydraulic fluid reservoir by way of conduit 34a.

By thus controlling the amount of hydraulic fluid and the speed and direction with which the hydraulic fluid is driven by servo valve assembly 2, by simply drivingly rotating spool 6 with reference to valve housing 4, the ram of a drive mechanism of a machine, for example a sheet fabrication machine, could readily be controllably driven.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the hereto appended claims.

What is claimed is:

1. A valve, comprising:
   a housing having at least two sets of opposed ports offset from each other at different locations along its longitudinal length;
   a hollow cylinder rotatably mounted within said housing, said cylinder having at least two sets of two adjacent orifices formed at different locations along the length thereof and an open end wherethrough fluid passes, each of said sets of two adjacent orifices being positionable to align with a corresponding one of said ports for effecting fluid communication between the inside of said cylinder and the outside of said housing, said each set of two adjacent orifices being offset from the other set of two adjacent orifices so that only one pair of two adjacent orifices is aligned with a corresponding one of said ports at any one time;
   wherein by selectively rotating said cylinder relative to said housing, a fluid path is established between said open end of said cylinder and either set of said two adjacent orifices and its corresponding port.

2. Valve of claim 1, further comprising:
   motor means workingly coupled to said cylinder for drivingly rotating said cylinder relative to said housing.

3. Valve of claim 1, wherein said cylinder is rotatable relative to said housing to at least one position so that none of said sets of two adjacent orifices is aligned with any of said ports to thereby cut off fluid communication between the inside of said cylinder and the outside of said housing.

4. Apparatus comprising:

a housing having at least a fore section and an aft section;

at least one port provided at each of the fore and aft sections of said housing, said ports at the fore and aft sections of said housing being offset from each other;

a spool rotatably mounted within said housing, said spool having a fluid passage at one end thereof and at least a fore and an aft section in correspondence to the fore and aft sections of said housing;

at least one pair of two adjacent orifices provided at each of the fore and aft sections of said spool, the respective pairs of two adjacent orifices at the fore and aft sections of said spool being positionable into alignment with corresponding ports at the respective fore and aft sections of said housing for effecting fluid communication paths between the interior of said spool and outside said housing, said respective pairs of two adjacent orifices being offset from each other so that only one of them is aligned with a corresponding one of said ports at any one time;

wherein by selectively rotating said spool relative to said housing, a fluid path could be established between said fluid passage and a selected one pair of two adjacent orifices of said spool and its corresponding port at said housing.

5. Apparatus of claim 4, further comprising:

servo motor means workingly coupled to said spool for rotating said spool at selective angles to align respective pairs of two adjacent orifices of said spool with corresponding ones of said ports of said housing to control the rate and direction of a fluid passing through said fluid passage.

6. Apparatus of claim 4, further comprising:

drive means in fluid communication with said fluid passage;

one conduit means for connecting said one port at one of the fore and aft sections of said housing to a fluid reservoir;

an other conduit means for connecting said one port at other of said fore and aft sections to a pump means;

wherein by selectively rotating said spool to control the alignment of the respective pair of two adjacent orifices to their corresponding ports, fluid is selectively controlled to traverse between said fluid passage and said one or other conduit means to control the operation of said drive means.

7. Apparatus of claim 4, further comprising:

motor means workingly coupled to said spool for driving said spool to rotate relative to said housing;

encoder means communicatively coupled to said motor means for monitoring the angular position of said spool relative to said housing; and processor means electrically connected to said motor means and said encoder means for utilizing the monitored angular position of said spool relative to said housing as a feedback to control the power to be supplied to said motor means to rotate said spool to thereby control the rate and direction of the fluid flowing through said spool.

8. Apparatus of claim 7, further comprising:

drive means fluidly coupled to said spool, the amount of fluid supplied to and withdrawn from said drive means being selectively controlled by the rotation of said spool; and an other encoder means electrically connected to said drive means to detect the position of a ram of said drive means, the detected position of said ram being sent to said processor means as a feedback for determining the accuracy with which said ram is driven.

9. Apparatus of claim 4, wherein said spool is rotatable relative to said housing to at least one position whereat none of said pairs of two adjacent orifices is aligned with any of said ports to thereby prevent fluid communication between said fluid passage of said spool and said ports.

10. Sheet fabrication system, comprising:

a piston movably fitted to a drive cylinder and slidably movable along the length of said drive cylinder when driven by a fluid;

a reservoir for storing said fluid;

a pump for pumping said fluid to said drive cylinder;

a valve assembly in fluid communication with said drive cylinder, said reservoir and said pump for regulating the rate and the direction said fluid traverses between said reservoir and said cylinder;

wherein said valve assembly includes a valve body having a plurality of ports along its length, certain ones of said ports in fluid communication with said reservoir and other ones of said ports in fluid communication with said pump;

a spool movably fitted into said valve body, said spool having a plurality of orifices along the length thereof and a passage at one end thereof fluidly connected to said drive cylinder, each of said orifices being rotatable about the longitudinal axis of said spool into and out of alignment with at least one corresponding said port at said body;

motor means workingly coupled to said spool for rotating said spool relative to said body so as to align, partially or completely, selective ones of said orifices with corresponding ones of said ports to establish fluid paths through the respective aligned orifices and ports for controlling the amount and rate of fluid traversing between said reservoir and said drive cylinder;

wherein there are at least four ports positioned along the length of said valve body, first two of said ports being positioned opposite to each other along a first axis orthogonal to the longitudinal axis of said body, and the other two of said ports being positioned opposite to each other along a second axis orthogonal to the longitudinal axis of said body, said first two ports being offset angularly from said other two ports; and wherein there are at least eight orifices positioned along the length of said spool, said eight orifices forming four pairs of two adjacent orifices, a first two pairs of said adjacent orifices being positioned opposite to each other along said first axis while the other two pairs of said adjacent orifices being positioned opposite to each other along said second axis, said first and other two pairs of orifices being offset from each other so as to align with said first and other ports of said body at different angular positions;

wherein as said spool is rotated relative to said body, said first and other two pairs of orifices are respectively alignable with said first and other two ports along said first and second axes, respectively.

11. System of claim 10, wherein said spool is rotatable relative to said body at at least angles of +45 degrees with respect to a referenced base whereat no fluid path is established between said orifices and said ports.

12. System of claim 10, wherein said pump is fluidly connected to said valve assembly for inputting under pressure said fluid from said reservoir into said valve assembly when selected ones of said orifices and ports are rotated into alignment, said fluid fed into said valve assembly being output under pressure to said drive cylinder to move said piston.

13. System of claim 10, wherein said fluid comprises a hydraulic fluid and said motor means comprises a servo motor.

14. System of claim 10, further comprising:
   first encoder means communicatively coupled to said motor means for monitoring the angular position of said spool relative to said housing;
   second encoder means communicatively connected to said drive cylinder for monitoring the position of said piston; and
   processor means electrically connected to said motor means and said first and second encoder means for utilizing the monitored angular position of said spool and the position of said piston as feedbacks to control the power to be supplied to said motor means to rotate said spool.

15. System of claim 10, further comprising:
   first conduit means connecting said drive cylinder to said passage of said valve assembly;
   second conduit means connecting one of said ports of said body to said reservoir;
   third conduit means connecting an other of said ports to said pump;
   wherein said spool is selectively rotated by said motor means to control the rate and the flow direction of said fluid being input under pressure by said pump into said cylinder to drive said piston, said second conduit means providing an output for said fluid in said cylinder to return to said reservoir.

16. System of claim 10, wherein said spool is rotatable to at least one position relative to said body so that none of said orifices of said spool is aligned with any of said ports of said body to thereby cut off fluid communication between said reservoir and said drive cylinder.

* * * * *